US008213317B2

(12) United States Patent
Linkert et al.

(10) Patent No.: US 8,213,317 B2
(45) Date of Patent: *Jul. 3, 2012

(54) PROCEDURE FOR CORRECTING ERRORS IN RADIO COMMUNICATION, RESPONSIVE TO ERROR FREQUENCY

(75) Inventors: Barry Linkert, Petersburg (CA); James Zhu, Waterloo (CA); Salim Omar, Waterloo (CA)

(73) Assignee: Research In Motion Limited, Waterloo (CA)

( * ) Notice: Subject to any disclaimer, the term of this patent is extended or adjusted under 35 U.S.C. 154(b) by 1044 days.

This patent is subject to a terminal disclaimer.

(21) Appl. No.: 11/266,681

(22) Filed: Nov. 4, 2005

(65) Prior Publication Data

US 2007/0104108 A1   May 10, 2007

(51) Int. Cl.
*H04L 12/26* (2006.01)
(52) U.S. Cl. .................... 370/242; 370/229; 455/423
(58) Field of Classification Search .............. 370/241, 370/242, 252, 428, 229, 230, 231, 235, 236; 709/203, 223, 224; 714/2, 48; 455/423
See application file for complete search history.

(56) References Cited

U.S. PATENT DOCUMENTS

| 5,445,263 | A | | 8/1995 | Mohlenkamp et al. |
|---|---|---|---|---|
| 5,607,344 | A | | 3/1997 | Endres |
| 5,828,224 | A | | 10/1998 | Maruyama |
| 6,097,732 | A | * | 8/2000 | Jung .................. 370/466 |
| 6,168,221 | B1 | | 1/2001 | Carruth et al. |
| 6,199,070 | B1 | | 3/2001 | Polo-Wood et al. |
| 6,253,211 | B1 | | 6/2001 | Gillies et al. |
| 6,279,037 | B1 | * | 8/2001 | Tams et al. ............. 709/224 |
| 6,279,885 | B1 | | 8/2001 | Leon, Jr. |
| 6,516,424 | B2 | | 2/2003 | Satomi et al. |
| 7,127,507 | B1 | | 10/2006 | Clark et al. |

(Continued)

FOREIGN PATENT DOCUMENTS

DE          20206846          9/2003

(Continued)

OTHER PUBLICATIONS

European Patent Application No. 05 024 075.3 European Examination Report of dated Sep. 29, 2010.

(Continued)

*Primary Examiner* — Michael Thier
*Assistant Examiner* — Feben M Haile
(74) *Attorney, Agent, or Firm* — Perry+Currier Inc.; Kristjan Spence

(57) ABSTRACT

Errors of e.g database synchrony between radio-connected stations can be especially troublesome if continued and repeated, in that the task of detecting and correcting errors in transmissions between a mobile station and a server can quickly deplete resources in the mobile station. This problem is addressed by keeping an error-event-count in the server; when the count exceeds a threshold, the server signals the mobile to immediately transmit the recent-activity-log in the mobile, i.e the log in the mobile in which are recorded the detailed elements relating to assembling and transmitting the data packet in which the error was detected. Using the information in the recent-activity-log, the server can institute debugging strategies, and correct the problem. Preferably, the threshold is in two stages; above the first threshold, the mobile station is signalled to increase the level of detail as recorded in the recent-activity-logs (if the mobile is able to do so), and the actual transmission of the log only takes place above the second threshold.

14 Claims, 2 Drawing Sheets

U.S. PATENT DOCUMENTS

| | | | |
|---|---|---|---|
| 7,209,963 B2 | 4/2007 | Burton et al. | |
| 2001/0040462 A1 | 11/2001 | Haseyama | |
| 2002/0038796 A1 | 4/2002 | Leon, Jr. | |
| 2002/0184568 A1 | 12/2002 | Kurrasch | |
| 2002/0194319 A1 | 12/2002 | Ritche | |
| 2002/0194320 A1 | 12/2002 | Collins et al. | |
| 2003/0005107 A1* | 1/2003 | Dulberg et al. | 709/223 |
| 2003/0012138 A1* | 1/2003 | Abdelilah et al. | 370/231 |
| 2003/0140284 A1* | 7/2003 | Dettinger et al. | 714/48 |
| 2003/0237035 A1 | 12/2003 | Bowers et al. | |
| 2004/0010586 A1 | 1/2004 | Burton et al. | |
| 2004/0092266 A1 | 5/2004 | Olrik | |
| 2005/0185579 A1 | 8/2005 | Jung | |
| 2005/0186939 A1 | 8/2005 | Barnea et al. | |
| 2005/0258806 A1 | 11/2005 | Janik et al. | |
| 2006/0036893 A1* | 2/2006 | Anglin et al. | 714/4 |
| 2006/0230306 A1* | 10/2006 | Richards et al. | 714/7 |
| 2007/0014243 A1* | 1/2007 | Meyer et al. | 370/249 |
| 2007/0105546 A1* | 5/2007 | Linkert et al. | 455/423 |

FOREIGN PATENT DOCUMENTS

| | | |
|---|---|---|
| FR | 2872077 | 12/2005 |
| GB | 611873 | 6/1947 |

OTHER PUBLICATIONS

European Patent Application No. 06 123 406.8 European Examination Report of dated Sep. 29, 2010.

* cited by examiner

PROCEDURE FOR CORRECTING ERRORS IN RADIO COMMUNICATION, RESPONSIVE TO ERROR FREQUENCY

The technology as described herein relates to communication stations that communicate with each other e.g by radio transmission, through a server. That is to say, for communication between two stations, the sending device transmits information to the server, and the server routes the information to the appropriate receiving station.

The two stations might be (or might include) for example, (a) a mains-powered office-based computer, and (b) a battery-powered personal digital assistant (PDA), such as the BLACKBERRY (trademark) mobile data device.

The technology as described herein can be most advantageously applied when one (or both) of the two communicating stations is a battery-powered portable device. Portable or hand-held mobile devices are typically very restricted as to the amount of memory that can be provided on the device, and also as to the battery life that can be provided. The design emphasis is to save on-device resources for transmitting useful information. It is recognised that it is all too common a problem that communication time, and battery power, are wasted, because an error has arisen that is not being corrected.

However, generally, even if power supply and data storage are not restricted, when two stations are communicating through a server, it is nearly always advantageously economical to utilise transmission time efficiently, whereby the systems as described herein are generally applicable. The systems are aimed at efficiently dealing with errors, and particular with certain kinds of troublesome and costly errors.

The systems as described herein are concerned with the kinds of errors that arise in the communicating stations, and can be detected by the server—that is to say, the errors can be detected by diagnostic routines programmed into the server. This includes error events that might be regarded rather as being detected by the stations, and then the station communicates the fact of the event to the server. The systems as described herein are not concerned with errors that can be detected and corrected at the station level.

It is recognised that many of the transmission problems detected by a server arise because of errors in the communicating stations in which the data items are composed, and especially errors that arise in the networks associated with the communicating stations. On-station facilities can sometimes correct these errors, but data packets containing errors often are transmitted.

Knowing that the errors often do correct themselves, a traditional or conventional server, upon detecting a communication error in a data packet, simply instructs the appropriate station to re-send the offending data packet. That is to say, when the server detects that an incoming data packet contains an error, usually the only response required of the server is simply to instruct the station to re-send the data packet.

Indeed, it has not traditionally been regarded as one of the server's responsibilities, to take an active part in diagnosing and correcting errors that arise in the communicating stations, beyond instructing the station to repeat the data packet or datagram; rather, if the errors cannot be corrected by such simple means, the matter has been regarded as the responsibility of the designers of the stations.

A difficulty that can arise with certain kinds of errors, when the error does not correct itself, is that the communication transmission system, including the server, becomes bogged down by the server repeatedly instructing the station to re-send the data packet, or by the server repeatedly carrying out some corrective routine, such as a sync-check, which is not actually correcting the problem.

In many cases, eventually the (human) user at one of the stations will complain to the server about the delays and poor performance. Now, the engineer at the server can know that there is a problem caused by an error at the station. The problem arises that the engineer is unable to correct the error due to lack of information. Often, by the time the user at the station contacts the engineer, the error is no longer present, and information relating to the error is no longer available, on the station, and even if the error or the information is still present, the user does not know how to give the engineer the needed information.

It is recognised that many of these troublesome errors can be addressed automatically, and very efficiently, by a rather simple change in operating procedure at the server. Indeed, it is recognised that many of what have been the most troublesome and frustrating errors can, upon implementing the systems as described herein, be corrected invisibly, i.e without the human users of the stations being aware that any problem had even arisen.

The systems as described herein are aimed at correcting errors in radio transmissions between a station and a server. Preferably, the station keeps a record, termed an recent-activity-log, in memory at the station, of the procedural elements as followed by the station when making a transmission. Preferably, the server monitors transmissions from the station, for errors. Preferably, if/when an error event is detected, the server responds by incrementing an error-events-counter in the server. Preferably, if/when the error-count reaches a threshold, and subsequently an error is detected, the server sends a signal to the station, being a signal that instructs the station to transmit the recent-activity-log to the server. Preferably, upon receiving the recent-activity-log, the server determines whether it can, with the aid of the recent-activity-log, formulate a strategy for correcting the error, and then does so.

DETAILED DESCRIPTION OF PREFERRED EMBODIMENTS

By way of further explanation, exemplary embodiments will now be described with reference to the accompanying drawings, in which.

The procedures shown in the accompanying drawings and described below are examples. It should be noted that the scope of protection sought is defined by the accompanying claims, and not necessarily by specific features of exemplary embodiments.

Figure 1:
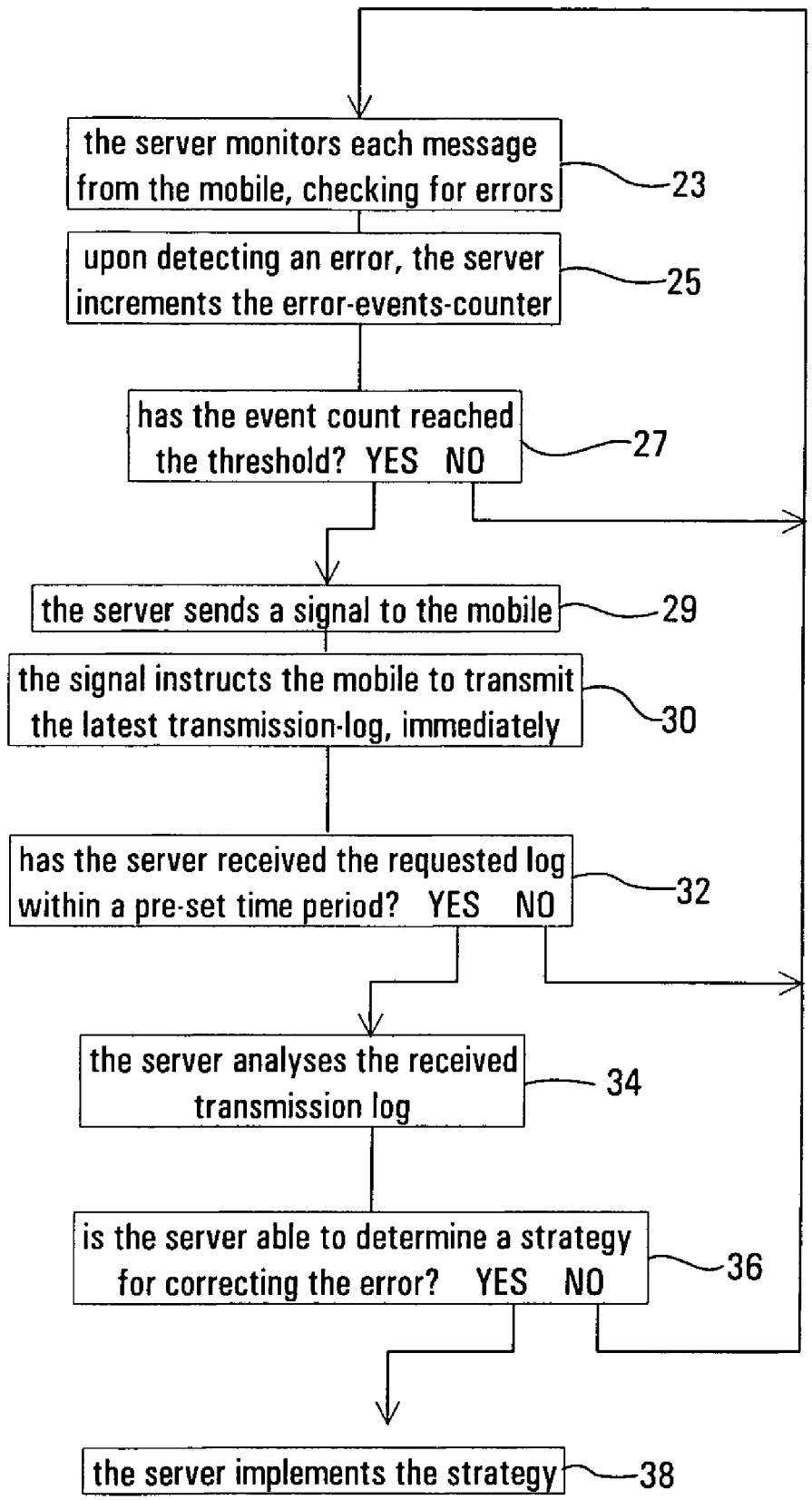
FIG. 1 is a diagram illustrating a procedure to be followed by a server.

The diagram of FIG. 1 represents the procedures followed by the server that is handling a communication between two stations.

Station A is an office-based computer, powered by mains-electricity, which typically is on a local wired or wireless local office network. Station B is remote, and mobile, and in the particular example is a BLACKBERRY (™) personal digital assistant, which is connected to the office network by a radio link. The stations subscribe to the particular server that operates the radio link.

The stations exchange information in the form of data packets. Each packet includes, in addition to the data itself and the identification of the desired recipient, suitable markers or identifiers as to what the data relates to, and how the data is to be characterised by the receiving station.

The communicated information may be of many different types. The errors with which the systems as described herein are concerned, are typically of the kind that arise when the data packets are communicating updates to databases, and when the error causes the databases in the stations to become out of synchrony. However, other types of errors also can benefit from implementing the error-correcting system as described herein.

In the example depicted in FIG. 1, the remote or mobile station-B is communicating with the server, i.e is transmitting packets of data to base-station-A, via the server. In the example, the data comprises updates to a database. The station-A version of the database has to be in synchrony with the station-B version of that particular database, prior to the transmission of update information.

In procedure 23, the server is monitoring the data packets coming in from the mobile station, checking for errors. If the server detects an error, the server increments (procedure 25) the appropriate error-event-counter. (The server might be tracking several different kinds of errors, each with its own error-event-counter.)

The kind of error the server is concerned with is the kind that can be ignored if it happens only once, or only a few times. If the error occurs once and then goes away, that indicates that the error has been picked up, and corrected, automatically.

In procedure 27, the event count has reached the pre-determined threshold for that particular error.

Generally, this threshold will not be an absolute count, but rather will be a count per unit of time, or error-frequency. The counter, in the server, can be programmed to re-set itself, or to reduce the count, automatically, if no further errors have been received in a period of time, as determined by an algorithm in the server. The algorithm can be simple or complex, as the designer of the server might specify, and may be different for each type of error. It is preferred that the algorithm includes a facility whereby, if the number of errors per unit of time should wane, the counter will re-set, on the grounds that the fact of waning indicates that the error has sorted itself out.

In procedures 29,30, the count of errors from the mobile station having exceeded the threshold, now the server issues a signal to the mobile station. The signal instructs the mobile station to transmit, preferably immediately, the recordings, as currently stored in the mobile device, of the details of the procedural elements as carried out in the station, relating to (and just preceding) the assembly of the data packet and to its manner of transmission to the server.

This information is required by the server in order to enable the server to isolate and diagnose the error problem—and, of course, to correct the problem if possible. It may be regarded that the information recorded in the mobile device, as desired by the server, is information that will aid de-bugging generally. For present purposes, the recordings of the procedural elements performed is referred to as the recent-activity-log.

Insofar as the designer can select what types of information will be recorded, the information that preferably should be recorded is all information that might potentially help the server (or the engineer at the server) to diagnose and correct the error. However, it is in many cases not possible to select or choose just what information is recorded, in that mobile devices are often programmed to record all procedural elements of a certain type, and to not record any of the elements of other types. However, as will be explained, certain types of mobile devices do have the facility of enabling a change to be made in the level of detail (i.e in the number of types of procedural elements) that is recorded in the recent-activity-log in the device.

This especially includes information relating to the transmission itself, but relating also e.g to local network activity that might have taken place just before transmission, or e.g to steps of some unrelated program that might have been executed on the device just before transmission, and so on.

Naturally, the more data that is recorded, the more memory and transmission time is required to transmit it. Often, in many types of mobile device, on-device memory is at a high premium, and the recent-activity-log can be stored in on-device memory only for a short time.

Usually, the recent-activity-log is configured as a block of memory, in the device, in which the recordings of the procedural elements are stored in sequential order. The device can detect when the log is full, and can overwrite older stored recordings with incoming new recordings, on a first-in-first-out basis.

Thus, it is important, in order for the server to be able to benefit from the information, for the mobile device to transmit the recent-activity-log more or less immediately, i.e before the information recorded in the log can be over-written. Of course, the manner of arranging, and the contents of, the recent-activity-log vary a good deal with the different makes of mobile device, but in some ways the recent-activity-log may be compared with an aircraft's black box, which provides a record of the last few moments leading up to an accident, of the various recorded parameters. The recent-activity-log can be regarded basically as one single composite record, in which the information keeps on being replaced.

Another reason why the server requires the recent-activity-log to be transmitted immediately is that the connection between the server and the mobile station might shortly be broken, as the station is switched off-line. In the case where the device remains constantly on-line, still the recent-activity-log preferably should be transmitted immediately, and the error corrected; it is a drain on the battery, and other resources, for the server to initiate the repeat-send instructions, to perform sync-checks, and to take other error correction measures, and to carry on doing so, over and over, if the error is not being corrected.

Instead of being transmitted immediately, the recent-activity-log might be stored on the mobile device, for transmission to the server next time the mobile station is connected to the server; but that is not preferred, because in that case the potential for the log's usefulness to be destroyed is much greater.

In procedure 32, having issued the instruction, the server now waits for the desired recent-activity-log to be received from the mobile device. If the log has not been received within a short waiting-period, or before the mobile device goes off-line, the server starts again with procedure 23—without re-setting the counter, of course. Then, the next time the mobile device is on-line, and an error event is detected, the event count is still (in fact, is now further) above the threshold, and so the server again sends the signal to the mobile device to transmit the latest recent-activity-log.

Once the server has received the recent-activity-log, in procedures 34,36, the server now analyses the information, and determines whether it has enough information to determine a strategy for correcting the error. If not, the server returns to procedure 23 (again without re-setting the counter). The intent is that enough information will be forthcoming, either on a simple accumulation basis, or because one of the transmitted logs finally does pin-point the actual error, to enable diagnosis and correction. Indeed, the systems as described herein are intended to be used mainly in respect of errors about which this is true. That is to say, the systems as described herein can hardly be regarded as beneficial in the case of errors of a type that still cannot be diagnosed or resolved even after large quantities of procedural records have been received from the mobile device.

Once the information in the recent-activity-log is sufficient, or once the information from the accumulated logs is sufficient, the server then diagnoses and corrects the problem. After that, the server reverts to procedure 23, this time after re-setting the counter.

In fact, the designer might prefer not to re-set the counter following an implementation of an error-correcting strategy. Where the server has been programmed to reset the counter in response to the errors petering out, then the counter will automatically re-set itself if the error has indeed been corrected. If it turns out that the error has not been corrected, it is preferred that the procedure should continue anyway.

The scope of the words "correcting the problem" should be widely construed. Depending on the type of error, it might only be possible for the server to diagnose the problem, while an action that cannot be performed directly by the server is needed to finally correct the problem. For example, the server might diagnose a hardware problem on the mobile device, and this diagnosis can be communicated to the (human) user by means of e.g an automatic text message, to the effect that the user needs to take the device in for repair. Thus, the systems can be advantageous even when "correcting" amounts to the server merely diagnosing the problem, and communicating the diagnosis to the device. Sometimes, all the server is able to do is to confirm that there is nothing wrong with the transmission of the data, and therefore the problem must lie elsewhere. This can be a valuable step on the way towards a final resolution of the problem.

However, usually, the kind of errors with which the systems as disclosed herein are mainly concerned are the kind that can be corrected by the server. This is especially true of errors of the kind that lead to the databases in the communicating stations being out of synchrony, in that the server can initiate sync-checks, and the server itself can initiate and perform procedures to get the stations back in synchrony. Also, recurrent errors of mis-formatting can be corrected, once an examination of the recent-activity-log has pinpointed the fault. By contrast, hardware problems on mobile devices rarely give rise to the kind of oft-recurring error that can be beneficially addressed by the procedures as described herein.

The operations performed by the server can be more or less sophisticated. That is to say, the server can be programmed to diagnose and deal with the error problems fully automatically, each type of error dealt with its in own unique way, and/or the server can be programmed to require interaction with a human administrator, who might initiate contact with the (human) user of the mobile station, if that seems to be useful as a way of correcting the problem. There is, generally, little practical limit to the diagnostic and curative programming sophistication that can be provided at the server—which may be contrasted with the mobile station where, of course, diagnostic resources are at a tight premium. Preferably, it should be an aim of the designer that nothing at all is required on the mobile device, by way of extra software, or extra hardware, or other special provisions for implementing the technologies as described herein.

Figure 2:
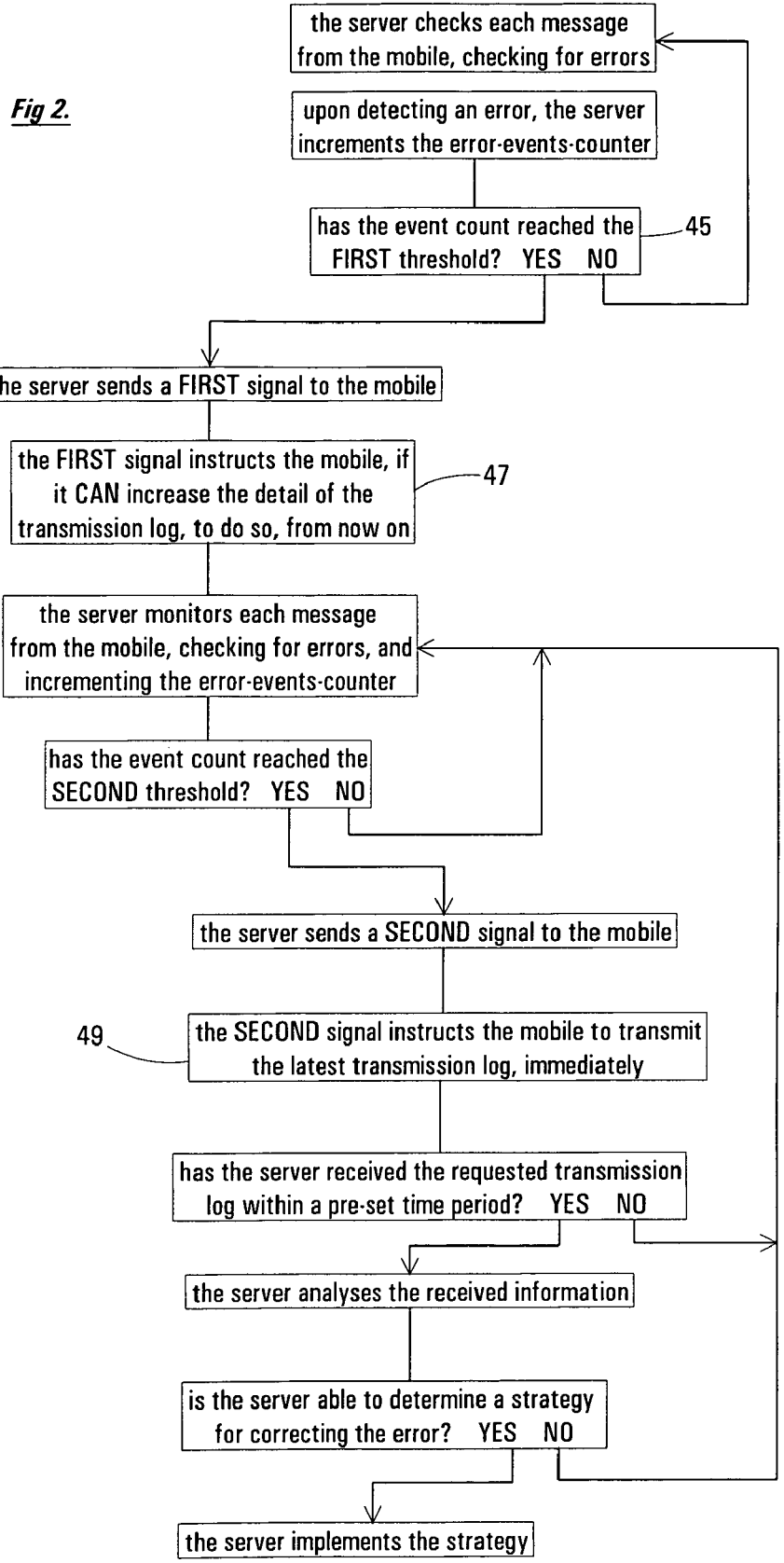
FIG. 2 illustrates another procedure to be followed by a server.

FIG. 2 shows a refinement that can be useful when the mobile device is sophisticated enough to be capable of responding to a signal from the server, instructing the mobile device to increase the level of recording that goes into the recent-activity-log. (Some versions of) the BLACKBERRY (™) PDA, for example, can be so instructed.

In this case, if the error event count exceeds a first threshold (procedure 45), the server instructs the mobile device (procedure 47) to step up or enhance its recent-activity-log recordings—for example, as to level of detail retained in the recordings, and/or the logging duration period. For example, the level of detail can be e.g stepped through: (a) basic; (b) information retrieval; (c) de-bugging; and so on. Of course, the more detailed the recording, and/or the further back the activities that are recorded, the greater the amount of high-premium on-device memory that is needed.

The server also sets a second threshold, whereby, in the interim between the two thresholds, the mobile station is recording (but not yet transmitting) the enhanced recent-activity-logs. Then, when the second threshold is reached (procedure 49), the server now instructs the mobile device to send the latest log. Again, after analysis of the log, the server might determine that a further log is required, and if so, that can be requested next time the error event occurs.

Again, if, at any time, the number or frequency of error events should die away, and further logs are not forthcoming, the server may be programmed to assume, after a time, that the error has corrected itself, and then to re-set the threshold counters to zero.

In the mode of operation as shown in FIG. 2, it is not necessary that all the stations connected to the server be sophisticated enough to respond to the call to increase the detail of the recent-activity-log. An unsophisticated station simply ignores the first threshold, but will send its (not so detailed) recent-activity-log after the error count passes the second threshold, in the manner as described with reference to FIG. 1. In other words, the station only responds to the call to increase the level of detail in the recent-activity-log if it is capable of doing so.

In both FIG. 1 and FIG. 2, the server preferably is programmed to detect the case where, after the server has instructed the mobile device to send its recent-activity-log, and the mobile device either does not do so after repeated requests, or does so repeatedly but the information in the several now-received logs still is not enough to correct the problem. Preferably, the server should not just go on and on, endlessly seeking information that apparently will not be forthcoming. If that were permitted, even the other communications between the server and the mobile device, i.e the communications in which no error event occurs, would or might become bogged down due to procedures for dealing with the uncorrected error. This is the very situation which the systems as described herein are intended to alleviate.

The server preferably is programmed, upon detecting that the error cannot be corrected, to send e.g a text message to the subscriber at the mobile station, to the effect that an error has been detected, which cannot be corrected automatically. The message may be supplemented by appropriate further instructions to fit the particular case.

Examples of some of the types of errors that can be addressed by the present systems will now be considered.

Mainly, the errors of present interest are errors that have the effect of placing a database in station-A out of synchrony with the corresponding version of the database in station-B. As mentioned, traditionally and conventionally the matter has been corrected by a simple re-send of the offending datagram; but the concern here is with those cases where that simple procedure does not correct the problem.

Of course, if an error lies in the data itself—through having been mis-typed, for example—there is not much that can be done about that. Such errors can (sometimes) be detected by e.g double-entry detection systems; but these are not likely to be the kind of errors that are conveniently dealt with by implementing the present system. Entry-errors tend to be single events, which are corrected (if they are corrected at all) on a one-time basis, whereas the present systems are aimed at errors that are not significant if they occur just once, but which become troublesome when they recur repeatedly. (An inept (human) operator might make many data-entry mistakes, but that would be a case of many separate errors, each of which requires its own detection, and its own correction, whereas the present system is more concerned with repeated occurrences of the same error.)

EXAMPLE 1

Packet Formatting and Protocol Errors

Here, the station-A and station-B databases become out of synchrony because the formatting of, i.e the protocol for assembling, the datagram, has not been (or appears not to have been) performed in the manner as needed for the data-packets to be properly recognised by the other station. Often, this type of error might be due e.g to a momentary interruption of transmission, and it can indeed be corrected by a simple re-send. The present system is intended to be available for diagnosing and correcting this kind of error, when it becomes frequent, i.e when it cannot be corrected by a simple re-send.

EXAMPLE 2

Type-of-data Inconsistency

Here, the station-A and station-B versions of the database become out of synchrony because an item of data detectably does not fit into the data-field to which it appears to have been assigned, or the items seem to have been assembled in a detectably-wrong order. Again, these errors might be short-lived, in that they might be corrected by the database programs at the stations. The present system is intended to be available for diagnosing and correcting this kind of error, when it persists (i.e is repeated) over a period of time.

When the database versions in the stations A and B do become out of synchrony, and the server recognises this fact, what might happen is that the server imposes a slow-sync mode onto the communications between the stations. Now, not only is the individual data packet repeated, but the synchronisation process is also individually repeated, at a slower speed. While the occasional slow-sync is not significant, repeated slow-sync events can be very wasteful of transmission time, and of on-device resources. In the procedures as described above in relation to FIGS. 1 and 2, it was the occurrence of a slow-sync episode that triggered the error-event-counter in the server.

It may be regarded that the more slow-sync events that occur, within a given time frame, the greater the need for the systems as described herein. However, implementing the described systems may be done to address errors other than those that lead to slow-sync episodes. But slow-sync errors do typify the kind of procedures that quickly over-use and deplete resources, and yet which can (usually) be addressed automatically by the systems described herein.

There can be many reasons, in detail, as to why an error leads to a slow-sync procedure. In diagnosing the problem, the server needs the assistance of the recent-activity-log or logs, as derived, immediately, from the error event itself. A complete and detailed recent-activity-log enables the server to zero in on the information needed to de-bug the offending transmission.

A typical example of a repeated-slow-sync problem, and the manner in which the present technology assists in its solution, will now be described in more detail.

The example is termed an invalid-sync-state error. The error occurs during transmission of a datagram, between e.g the base-station and the mobile-station, through the server.

Considering a particular database: there are two versions thereof, one in the base-station and the other in the mobile-station. The base version should be in synchrony with the mobile version of the same database. In this case, what this means is that sync-anchors in the base version of the database will match, if all is well, the corresponding sync-anchors in the mobile version of the database.

During a transmission of a datagram from the base-station to the mobile-station, the sync-protocol between the server and the base-station, and between the server and the mobile-station, makes use of the sync-anchors.

The stations, or the server, may issue sync requests, in which the server checks whether the sync-anchors of the base-station version of the database, match the sync-anchors of the mobile-station version of the database.

Upon carrying out a sync-check, the server might detect that there is a mis-match between the respective sync-anchors of the two versions. Such a mis-match, upon being detected by the server, triggers an invalid-data-sync error.

In some cases, it is possible for the sync-check to be done by the receiving station, by comparing the sync-anchors contained in the receiving station's version of the database with the sync-anchors embedded in the datagram coming in from the server.

Having detected an invalid-data-sync error, the server signals the error to the two stations, and (having first carried out the usual verification checks) then triggers the slow-sync-procedure. This procedure is aimed at checking the sync-anchors, aiming to find exactly where the inconsistency lies, and then to amend the inconsistency.

The slow-sync-procedure is usually effective, eventually, to re-synchronise the two versions of the database. However, the procedure is wasteful of resources, including CPU, memory, battery power, OTA traffic, etc. Also, the procedure occupies communication time between the stations, which is simply time wasted as far as the transfer of useful data is concerned.

However, the purpose and function of the slow-sync procedure is to restore synchrony between the version of database stored in the mobile-station and the version stored in the base-station. The problem that arises, with which the systems as described herein are concerned, is not so much that the slow-sync procedure fails to restore synchrony, but that the resources and time needed per restoration are so wasteful.

If an invalid-sync-state error event happens just once, or happens only very occasionally, the slow-sync-procedure carries out the function for which it was designed, and restores synchrony. This wastes resources and time, but then that is the end of it. But if the invalid-sync-state error keeps on occurring repeatedly, now the wastage of resources and time can become very significant. Thus, the invalid-sync-state error is typical of the type of error that can benefit from the systems of the kind as described herein.

Traditionally, when an invalid-sync-state error event was detected, the system would simply initiate the slow-sync-procedure, and would carry on initiating the procedure, over and over, each time the error was repeated. This repetition could be detected by the server, and of course certain diagnostic procedures could be done automatically, either in the server or in the stations, but in the end, often, a (human) engineer (at the server) would have to take steps to find out the cause. However, as described, it was all too often the case that there was not enough information available at the server, especially information from the mobile station, for a proper diagnosis, and the error would keep on repeating until finally the error did become apparent.

When the systems as described herein are implemented, by contrast, now it is the fact of the repetition of the error that (automatically) triggers the server to signal the mobile-station, and/or the base-station, to send or re-send the recent-activity-log. Thus, transmission resources are not wasted in constantly sending redundant logs, and yet the logs are indeed sent at the times when there is an excellent chance that the information they contain will be useful.

In the example being described, the two-stage procedure as described in relation to FIG. 2 makes for a very efficient implementation. Thus, at the first invalid-sync-state error event, the server initiates (as it does in the traditional systems) the slow-sync-procedure. The procedure works, and synchrony is restored, and the server does nothing more (apart from incrementing the invalid-sync-state-error-event counter). But now, if a second invalid-sync-state error event occurs within, for example, fifteen minutes of the first (that is to say, within fifteen minutes of transmission operation time), now the server sends a signal to the mobile-station (and/or to the base-station) to increase the level at which transmissions are logged. At the same time, the server initiates the slow-sync-procedure, and again increments the error event counter.

If a third invalid-sync-state error event should occur within, say, fifteen minutes of the second event, now the server sends a signal to the station(s) to be ready to transmit the high-level. transmission logs, and again the server initiates the slow-sync-procedure, and again increments the error event counter.

If a fourth invalid-sync-state error event should occur within, say, fifteen minutes of the third event, now the server sends a signal to the station(s) to actually commence transmitting the high-level transmission logs to the server. These logs are packaged and stored at the server, ready to serve as aids in the investigation and diagnosis. The designer might prefer to have the server disable or break off the attempted transmission of datagrams between the stations, at this time, while the diagnosis and remediation exercise is being carried out.

The designer can program the server such that, if repetitions of the error do not occur within the various fifteen-minute time periods, the server arranges for the error event counter to be reset, or set back, depending on what the designer may judge to be most efficient.

A station, as that term is used in this specification, is an entity that can send communications (especially radio communications) to, and/or receive communications from, a server. The station might, in some cases, be a single computer or similar device. In other cases, the station might be a local-area-network covering several computers. Generally, the stations may be regarded as the individual subscribers to the server, i.e as the individual users of the communication facility offered by the server.

Each station includes a number of devices. (The number might be one.) A device, as that term is used herein, includes a fixed computer, which is powered by mains electricity, and is networked with other computers, either by hard wires or wirelessly. A mobile device, as that term is used herein, includes a laptop computer, and includes a PDA, a cell phone, and similar (and dissimilar) products that are battery-powered and are capable of radio communication with servers. Such a mobile device is often not connected into a local network, and may equally be termed a mobile station.

It is common for computers and other devices, when in communication over networks of many different kinds, to adopt a master/slave relationship, in which one of the devices controls the other device(s) that are participating in the communication. It is common, when the master/slave relationship is used in a communication network, for the network to include a controller (software or hardware), which has the capability to assign the role of master, in the master/slave relationship, selectably to the various computers or devices—either in turn, or e.g in response to the needs of a particular communication.

In such a case, the network controller may be regarded as the server, or as equivalent to the server, as that term is used herein, even though the communications are e.g by wire, rather than by radio, and even though the relationship of the device or station to the controller might be regarded merely as that of a co-communicator, rather than that of a subscriber.

However, it is recognised that the error detection and correction arrangements as described herein are particularly advantageous when applied to radio communications, because of the commercial reality of the on-going (and large) expense attributable directly and proportionately to the time actually spent in occupation of the radio communication channel.

The invention claimed is:

1. A server, having a system for correcting errors in transmissions from a station to the server, wherein the server is programmed:
   to monitor transmissions from the station, for errors;
   responsive to detecting an error of a type A, termed an A-error, in one of the transmissions, to increment an A-error-events-count in the server without sending a signal to the station;
   monitoring, detecting and incrementing, without sending a signal responsive to the monitoring, detecting and incrementing, until the A-error-events-count reaches a threshold;
   responsive to the A-error-events-count reaching the threshold, and upon detecting a further A-error in a subsequent transmission, to send a signal to the station, being a signal that instructs the station to transmit to the server the recordings stored in a recent-activity-log at the station;
   responsive to receiving and analyzing the recordings, to make a determination whether the server can, with the aid of the recordings, formulate a strategy for correcting the error; and
   responsive to such determination being affirmative, to carry out the strategy.

2. The server of claim 1, wherein the server is also programmed:
   to monitor transmissions from the station for errors of a type B, termed B-errors;
   responsive to detecting one of the B-errors in one of the transmissions, to increment a B-error-events-count in the server, and to increment same independently of the A-error-events-count;
   responsive to the B-error-events-count reaching a B-threshold, and upon detecting a further B-error in a subsequent one of the transmissions; to send a signal to the station, being a signal that instructs the station to transmit to the server the recordings stored in the recent-activity-log;

responsive to receiving and analyzing the said recordings, to make a determination whether the server can, with the aid of the recordings, formulate a strategy for correcting the B-error; and responsive to such determination being affirmative, to carry out the strategy.

3. The server of claim 1, wherein the server is programmed, responsive to not receiving the requested recordings stored in the recent-activity-log within a pre-determined waiting-time, as follows:

to monitor transmissions from the station, for errors;

upon detecting a further A-error in a subsequent transmission, to send a signal to the station, being a signal that instructs the station to transmit to the server the recordings currently stored in the recent-activity-log;

responsive to receiving and analyzing the said recordings, to make a determination whether the server can, with the aid of the recordings, formulate a strategy for correcting the error; and responsive to such determination being affirmative, to carry out the strategy.

4. The server of claim 1, wherein the server is programmed as follows:

to relate the A-error-events-count to time, the number of A-errors detected within a pre-determined time period being termed A-error-frequency; and to vary the threshold in accord with the A-error-frequency, in the sense of increasing the threshold as and when the A-error-frequency reduces.

5. The server of claim 1, wherein the server is programmed, upon receiving and analyzing the said recordings, and upon making a determination that the server cannot, even with the aid of the recordings, formulate a strategy for correcting the error, as follows:

to make a server-copy of the said recordings of the recent-activity-log, and to store same in the server;

to monitor transmissions from the station, for errors;

upon detecting a further A-error in a subsequent transmission, to send a signal to the station, being a signal that instructs the station to transmit to the server later-recordings as currently stored in the recent-activity-log;

responsive to receiving and analyzing the said later-recordings, to make a determination whether the server can, with the aid of the recordings and the later-recordings, formulate a strategy for correcting the error; and responsive to such determination being affirmative, to carry out the strategy.

6. The server of claim 1, wherein the server is programmed to include an instruction, in the signal, for the station to transmit immediately the recordings stored in the recent-activity-log.

7. The server of claim 1, in combination with the station from which the server receives transmissions, wherein the station is programmed:

to make recordings of procedural elements performed by the station, in leading up to making, and in making, transmissions to the server;

to store the recordings in a recent-activity-log at the station; and to be capable of receiving, and of responding to, a signal from the server instructing the station to transmit to the server the recordings stored in the recent-activity-log.

8. The combination of claim 7, wherein the station is programmed:

to store the recordings in the recent-activity-log in sequential order;

to detect whether the recent-activity-log is full; and responsive to the recent-activity-log being full, to overwrite older stored recordings with incoming new recordings, on a first-in-first-out basis.

9. The combination of claim 7, wherein the station is, or includes, a mobile device, which is portable and battery-powered.

10. The combination of claim 7, in further combination with a station-Q, wherein:

the station is station-P, and is in communication, via the server, with the station-Q;

a database-P is stored in station-P, and the database-P corresponds to a database-Q stored in station-Q;

the A-error is an error that causes a lack of synchrony between database-P and database-Q, the lack of synchrony being such that it can be detected by the server, upon the server being programmed to do so; and the strategy includes a procedure initiated by the server for procuring synchrony between the database-P and the database-Q.

11. The combination of claim 7, wherein:

the station is also programmed as follows:

to be capable of responding to an instruction from the server to change the level of detail at which procedural elements are included in recordings stored in the recent-activity-log;

whereby the said recordings stored in the recent-activity-log, as recorded following an instruction from the server to increase the level of detail, are at a higher level of detail than previous recordings stored in the recent-activity-log, stored before that instruction;

the server is programmed to detect the said threshold as a second-threshold, and is also programmed to detect the A-error-events-count reaching a first-threshold, which is lower than the said second-threshold, as follows:

responsive to the A-error-events-count reaching the first-threshold, and upon detecting an A-error in a subsequent transmission, to send a signal to the station, being a signal that instructs the station to increase the level of detail at which subsequent recordings are stored in the recent-activity-log.

12. The combination of claim 7, wherein the transmissions are radio transmissions.

13. The server of claim 1, further being programmed, responsive to such determination being negative, to transmit a message to the station, the message comprising an indication that an error has been detected which cannot be corrected automatically.

14. A method for correcting errors in transmissions from a station to a server, comprising:

where the station is programmed:

to make recordings of procedural elements performed by the station, in leading up to making, and in making, transmissions to the server;

to store the recordings in a recent-activity-log at the station;

to be capable of receiving, and of responding to, a signal from the server instructing the station to transmit to the server the recordings stored in the recent-activity-log;

monitoring transmissions from the station, for errors;

responsive to detecting an error of a type A, termed an A-error, in one of the transmissions, incrementing an A-error-events-count in the server without sending a signal to the station;

monitoring, detecting and incrementing, without sending a signal responsive to the monitoring, detecting and incrementing, until the A-error-events-count reaches a threshold;

responsive to the A-error-events-count reaching the threshold, and upon detecting a further A-error in a subsequent transmission, sending a signal to the station, being a signal that instructs the station to transmit to the server the recordings stored in the recent-activity-log;

responsive to receiving and analyzing the said recordings, making a determination whether the server can, with the aid of the recordings, formulate a strategy for correcting the error; and responsive to such determination being affirmative, carrying out the strategy.

\* \* \* \* \*